United States Patent [19]
Sasaki et al.

[11] Patent Number: 6,055,968
[45] Date of Patent: May 2, 2000

[54] ENGINE

[75] Inventors: Shizuo Sasaki, Numazu; Satoshi Iguchi, Mishima; Takekazu Ito; Tsukasa Abe, both of Susono, all of Japan

[73] Assignee: Toyota Jidosha Kabushiki Kaisha, Toyota, Japan

[21] Appl. No.: 09/126,586

[22] Filed: Jul. 31, 1998

[30] Foreign Application Priority Data

| Aug. 4, 1997 | [JP] | Japan | 9-209503 |
| Nov. 7, 1997 | [JP] | Japan | 9-305817 |

[51] Int. Cl.⁷ .............................. F02M 25/07; F01N 3/20
[52] U.S. Cl. .................... 123/568.21; 60/274; 60/276; 60/299
[58] Field of Search .................. 123/568.11, 568.21, 123/568.26, 568.27; 60/274, 276, 278, 279, 285, 298, 299, 301

[56] References Cited

U.S. PATENT DOCUMENTS

| 4,142,493 | 3/1979 | Schira et al. | 123/568.21 |
| 4,454,854 | 6/1984 | Gotoh et al. | 123/568.27 |
| 4,519,366 | 5/1985 | May | 123/568.21 |
| 5,172,550 | 12/1992 | Takeshima | 60/278 |
| 5,172,674 | 12/1992 | Horie et al. | 123/568.27 |
| 5,482,020 | 1/1996 | Shimizu et al. | 123/406.47 |
| 5,551,408 | 9/1996 | Shimitzu et al. | 123/568.27 |
| 5,632,144 | 5/1997 | Isobe | 60/277 |
| 5,732,554 | 3/1998 | Sasaki et al. | 60/278 |
| 5,768,887 | 6/1998 | Nakamura et al. | 60/274 |
| 5,797,370 | 8/1998 | Kimura et al. | 123/568.21 |
| 5,826,427 | 10/1998 | Yanagihara et al. | 123/568.26 |
| 5,890,359 | 4/1999 | Enander | 123/568.21 |
| 5,890,360 | 4/1999 | Sasaki et al. | 60/276 |
| 5,937,639 | 8/1999 | Sasaki et al. | 60/276 |

FOREIGN PATENT DOCUMENTS

| 4-334750 | 11/1992 | Japan |
| 6-346763 | 12/1994 | Japan |
| 7-4287 | 1/1995 | Japan |

OTHER PUBLICATIONS

Sato, Yasuo et al., "A Simultaneous Reduction of NOx and Soot in Diesel Engines Under a New Combustion System," Spring Symposium 1996 held by Society of Automotive Engineers of Japan, Paper No. 205, May 1996, pp. 81–84.

*Primary Examiner*—Willis R. Wolfe
*Attorney, Agent, or Firm*—Oliff & Berridge, PLC

[57] ABSTRACT

An engine comprising an exhaust gas recirculation system, wherein a first combustion where the amount of the recirculated exhaust gas supplied to the combustion chamber is larger than the amount of recirculated exhaust gas where the amount of production of soot peaks and almost no soot is produced and a second combustion where the amount of recirculated exhaust gas supplied to the combustion chamber is smaller than the amount of recirculated exhaust gas where the amount of production of soot peaks are selectively switched. The exhaust gas recirculation rate is caused to be changed in a step-like manner when switching from the first combustion to the second combustion or from the second combustion to the first combustion.

15 Claims, 14 Drawing Sheets

ENGINE

BACKGROUND OF THE INVENTION

1. Field of the Invention

The present invention relates to an engine.

2. Description of the Related Art

In the past, in an internal combustion engine, for example, a diesel engine, the production of NOx has been suppressed by connecting the engine exhaust passage and the engine intake passage by an exhaust gas recirculation (EGR) passage so as to cause the exhaust gas, that is, the EGR gas, to recirculate in the engine intake passage through the EGR passage. In this case, the EGR gas has a relatively high specific heat and therefore can absorb a large amount of heat, so the larger the amount of EGR gas, that is, the higher the EGR rate (amount of EGR gas/(amount of EGR gas+amount of intake air), the lower the combustion temperature in the engine combustion chamber. When the combustion temperature falls, the amount of NOx produced falls and therefore the higher the EGR rate, the lower the amount of NOx produced.

In this way, in the past, the higher the EGR rate, the lower the amount of NOx produced can become. If the EGR rate is increased, however, the amount of soot produced, that is, the smoke starts to sharply rise when the EGR rate passes a certain limit. In this point, in the past, it was believed that if the EGR rate was increased, the smoke would increase without limit. Therefore, it was believed that the EGR rate at which smoke starts to rise sharply was the maximum allowable limit of the EGR rate.

Therefore, in the past, the EGR rate was set within a range not exceeding the maximum allowable limit (for example, see Japanese Unexamined Patent Publication (Kokai) No. 4-334750). The maximum allowable limit of the EGR rate differed considerably according to the type of the engine and the fuel, but was from 30 percent to 50 percent or so. Accordingly, in conventional diesel engines, the EGR rate was suppressed to 30 percent to 50 percent at a maximum.

Since it was believed in the past that there was a maximum allowable limit to the ECR rate, in the past the EGR rate had been set so that the amount of NOx and smoke produced would become as small as possible within a range not exceeding that maximum allowable limit. Even if the EGR rate is set in this way so that the amount of NOx and smoke produced becomes as small as possible, however, there are limits to the reduction of the amount of production of NOx and smoke. In practice, therefore, a considerable amount of NOx and smoke continues being produced.

The present inventors, however, discovered in the process of studies on the combustion in diesel engines that if the EGR rate is made larger than the maximum allowable limit, the smoke sharply increases as explained above, but there is a peak to the amount of the smoke produced and once this peak is passed, if the EGR rate is made further larger, the smoke starts to sharply decrease and that if the EGR rate is made at least 70 percent during engine idling or if the EGR gas is force cooled and the EGR rate is made at least 55 percent or so, the smoke will almost completely disappear, that is, almost no soot will be produced. Further, they found that the amount of NOx produced at this time was extremely small. They engaged in further studies later based on this discovery to determine the reasons why soot was not produced and as a result construct a new system of combustion able to simultaneously reduce the soot and NOx more than ever before. This new system of combustion will be explained in detail later, but briefly it is based on the idea of stopping the growth of hydrocarbons into soot at a stage before the hydrocarbons grow.

That is, what was found from repeated experiments and research was that the growth of hydrocarbons into soot stops at a stage before that happens when the temperatures of the fuel and the gas around the fuel at the time of combustion in the combustion chamber are lower than a certain temperature and the hydrocarbons grow to soot all at once when the temperatures of the fuel and the gas around the fuel become higher than a certain temperature. In this case, the temperatures of the fuel and the gas around the fuel are greatly affected by the heat absorbing action of the gas around the fuel at the time of combustion of the fuel. By adjusting the amount of heat absorbed by the gas around the fuel in accordance with the amount of heat generated at the time of combustion of the fuel, it is possible to control the temperatures of the fuel and the gas around the fuel.

Therefore, if the temperatures of the fuel and the gas around the fuel at the time of combustion in the combustion chamber are suppressed to less than the temperature at which the growth of the hydrocarbons stops midway, soot is no longer produced. The temperatures of the fuel and the gas around the fuel at the time of combustion in the combustion chamber can be suppressed to less than the temperature at which the growth of the hydrocarbons stops midway by adjusting the amount of heat absorbed by the gas around the fuel. On the other hand, the hydrocarbons stopped in growth midway before becoming soot can be easily removed by after-treatment using an oxidation catalyst etc. This is the basic thinking behind this new system of combustion.

Under this new system of combustion, the EGR rate for simultaneously reducing the soot and the NOx must be made at least about 55 percent. The EGR rate, however, can be made at least about 55 percent when the amount of intake air is small, that is, when the engine is operating under a relatively light load. If the amount of intake air passes a certain limit, it no longer becomes possible to make the amount of intake air increase unless reducing the EGR rate. In this case, however, if the EGR rate is gradually reduced from 55 percent along with the increase of the amount of intake air, the problem arises of the production of a large amount of smoke.

SUMMARY OF THE INVENTION

An object of the present invention is to provide an engine capable of extremely reducing the amount of production of soot and NOx when the engine is operating under a light load According to the present invention, there is provided an internal combustion engine in which an amount of production of soot gradually increases and then peaks when an amount of recirculated exhaust gas supplied in a combustion chamber increases and in which a further increase of the amount of recirculated exhaust gas supplied in the combustion chamber results in a temperature of fuel and surrounding gas in the combustion chamber becoming lower than a temperature of production of soot and therefore almost no production of soot any longer, the engine comprising: switching means for selectively switching between a first combustion where the amount of the recirculated exhaust gas supplied to the combustion chamber is larger than the amount of recirculated exhaust gas where the amount of production of soot peaks and almost no soot is produced and a second combustion where the amount of recirculated exhaust gas supplied to the combustion chamber is smaller than the amount of recirculated exhaust gas where the amount of production of soot peaks and exhaust gas recirculation rate control means for changing the exhaust gas recirculation rate in a step-like manner when switching from the first combustion to the second combustion or from the second combustion to the first combustion.

BRIEF DESCRIPTION OF THE DRAWINGS

The present invention may be more fully understood from the description of the preferred embodiments of the invention set forth below together with the accompanying drawings, in which.

DESCRIPTION OF THE PREFERRED EMBODIMENTS

Figure 1:
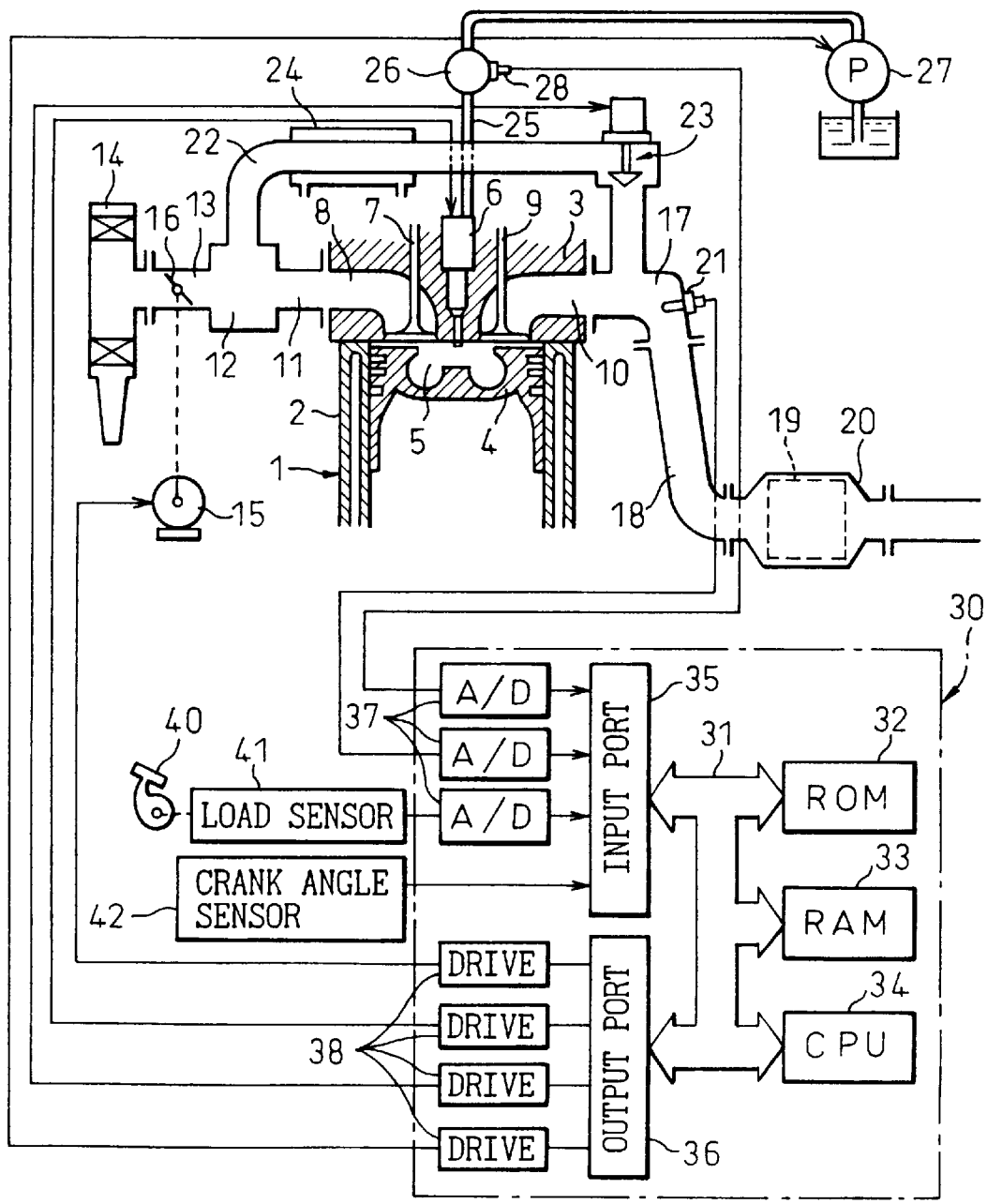
FIG. 1 is an overall view of a compression ignition type internal combustion engine.

FIG. 1 is a view of the case of application of the present invention to a four-stroke compression ignition type internal combustion engine.

Referring to FIG. 1, 1 shows an engine body, 2 a cylinder block, 3 a cylinder head, 4 a piston, 5 a combustion chamber, 6 an electrically controlled fuel injector, 7 an intake valve, 8 an intake port, 9 an exhaust valve, and 10 an exhaust port. The intake port 8 is connected through a corresponding intake tube 11 to the surge tank 12. The surge tank 12 is connected through an intake duct 13 to an air cleaner 14. A throttle valve 16 driven by an electric motor 15 is arranged in the intake duct 13. On the other hand, the exhaust port 10 is connected through an exhaust manifold 17 and exhaust tube 18 to a catalytic converter 20 housing a catalyst 19 having an oxidation action. An air fuel ratio sensor 21 is arranged in the exhaust manifold 17.

The exhaust manifold 17 and surge tank 12 are connected with each other through an EGR passage 22. An electrically controlled EGR control valve 23 is arranged in an EGR passage 22. Further, a cooling apparatus 24 for cooling the EGR gas flowing through the EGR passage 22 is provided around the EGR passage 22. In the embodiment shown in FIG. 1, the engine cooling water is guided to the cooling apparatus 24 where the engine cooling water is used to cool the EGR gas.

On the other hand, each fuel injector 6 is connected through a fuel supply tube 25 to the fuel reservoir, that is, a common rail 26. Fuel is supplied to the common rail 26 from an electrically controlled variable discharge fuel pump 27. Fuel supplied in the common rail 26 is supplied through each fuel supply tube 25 to the fuel injectors 6. A fuel pressure sensor 28 for detecting the fuel pressure in the common rail 26 is attached to the common rail 26. The amount of discharge of the fuel pump 27 is controlled based on the output signal of the fuel pressure sensor 28 so that the fuel pressure in the common rail 26 becomes the target fuel pressure.

The electronic control unit 30 is comprised of a digital computer and is provided with a ROM (read only memory) 32, a RAM (random access memory) 33, a CPU (microprocessor) 34, an input port 35, and an output port 36 connected with each other by a bidirectional bus 31. The output signal of the air fuel ratio sensor 21 is input through a corresponding AD converter 37 to the input port 35. Further, the output signal of the fuel pressure sensor 28 is input through a corresponding AD converter 37 to the input port 35. The accelerator pedal 40 has connected to it a load sensor 41 for generating an output voltage proportional to the amount of depression L of the accelerator pedal 40. The output voltage of the load sensor 41 is input through a corresponding AD converter 37 to the input port 35. Further, the input port 35 has connected to it a crank angle sensor 42 for generating an output pulse each time the crankshaft rotates by for example 30°. On the other hand, the output port 36 has connected to it through a corresponding drive circuit 38 the fuel injector 6, electric motor 15, EGR control valve 23, and fuel pump 27.

Figure 2:
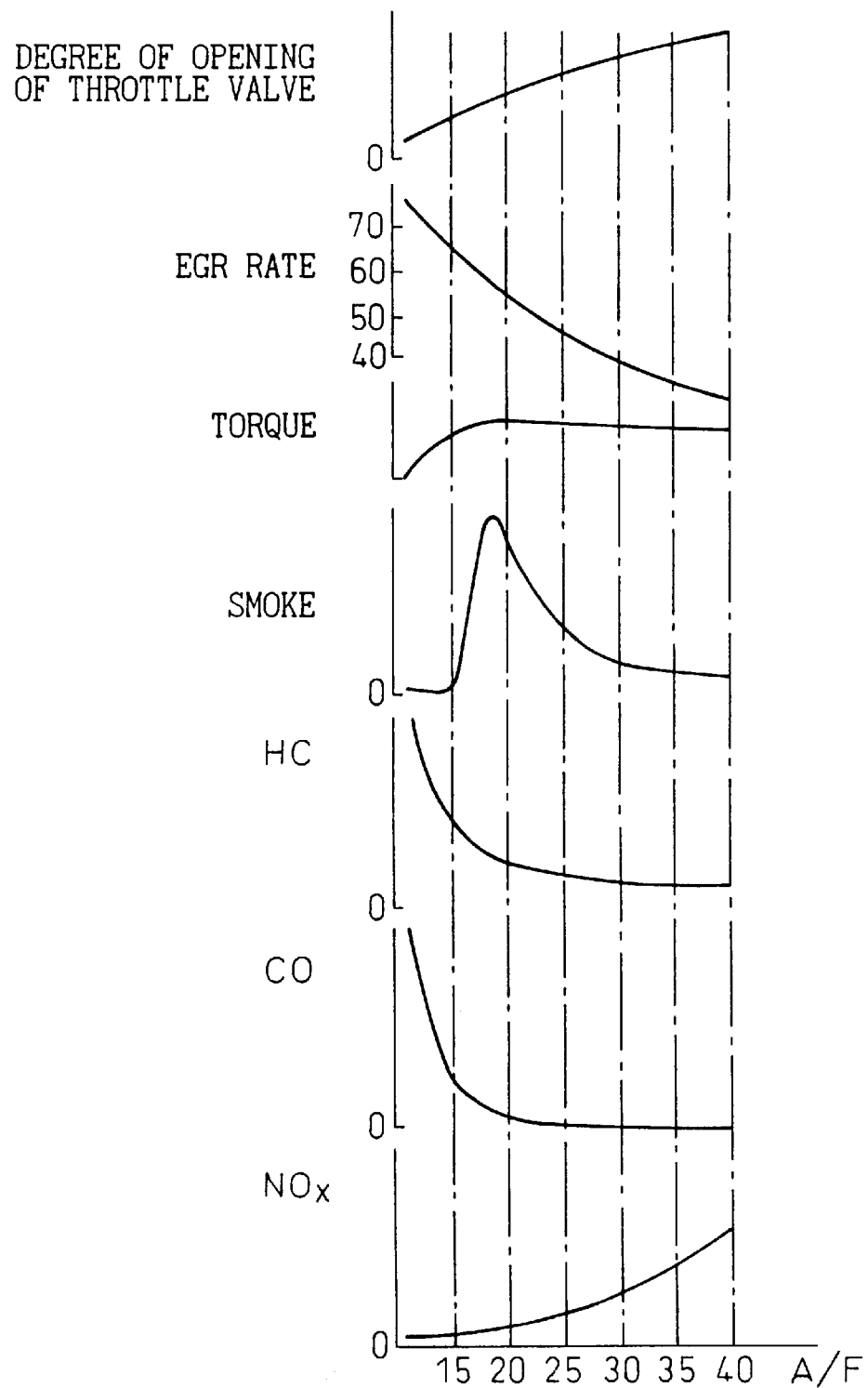
FIG. 2 is a view of the amount of generation of smoke and NOx.

FIG. 2 shows an example of an experiment showing the changes in the output torque and the amount of smoke, HC, CO, and NOx exhausted at that time when changing the air fuel ratio A/F (abscissa in FIG. 2) by changing the opening degree of the throttle valve 16 and the EGR rate at the time of engine low load operation. As will be understood from FIG. 2, in this experiment, the EGR rate becomes larger the smaller the air fuel ratio A/F. When below the stoichiometric air fuel ratio ($\approx$14.6), the EGR rate becomes over 65 percent.

As shown in FIG. 2, if increasing the EGR rate to reduce the air fuel ratio A/F, when the EGR rate becomes close to 40 percent and the air fuel ratio A/F becomes 30 degrees, the amount of smoke produced starts to increase. Next, when the EGR rate is further raised and the air fuel ratio A/F is made smaller, the amount of smoke produced sharply increases and peaks. Next, when the EGR rate is further raised and the air-fuel ratio A/F is made smaller, the smoke sharply falls. When the EGR rate is made over 65 percent and the air fuel ratio A/F becomes close to 15.0, the smoke produced becomes substantially zero. That is, almost no soot is produced any longer. At this time, the output torque of the engine falls somewhat and the amount of NOx produced becomes considerably lower. On the other hand, at this time, the amounts of HC and CO produced start to increase.

Figure 3A:
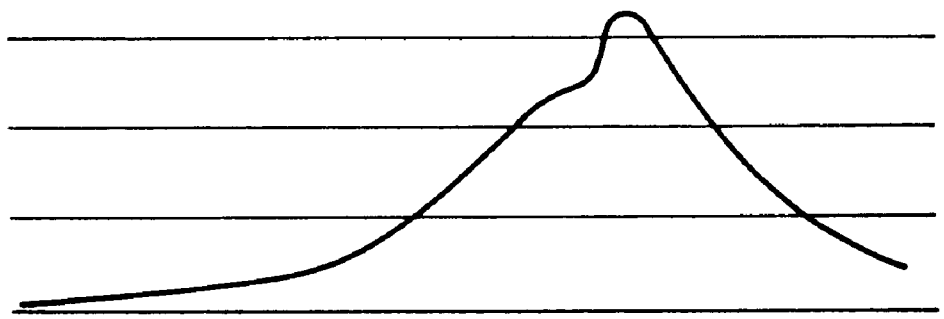
FIGS. 3A and 3B are views of the combustion pressure.
Figure 3B:

FIG. 3A shows the changes in compression pressure in the combustion chamber 5 when the amount of smoke produced is the greatest near an air fuel ratio A/F of 21. FIG. 3B shows the changes in compression pressure in the combustion chamber 5 when the amount of smoke produced is substantially zero near an air fuel ratio A/F of 18. As will be understood from a comparison of FIG. 3A and FIG. 3B, the combustion pressure is lower in the case shown in FIG. 3B where the amount of smoke produced is substantially zero than the case shown in FIG. 3A where the amount of smoke produced is large.

The following may be said from the results of the experiment shown in FIG. 2 and FIGS. 3A and 3B. That is, first, when the air fuel ratio A/F is less than 15.0 and the amount of smoke produced is substantially zero, the amount of NOx produced falls considerably as shown in FIG. 2. The fact that the amount of NOx produced falls means that the combustion temperature in the combustion chamber 5 falls. Therefore, it can be said that when almost no soot is produced, the combustion temperature in the combustion chamber 5 becomes lower. The same thing may be said from FIGS. 3A and 3B. That is, in the state shown in FIG. 3B where almost no soot is produced, the combustion pressure becomes lower, therefore the combustion temperature in the combustion chamber 5 becomes lower at this time.

Figure 4:
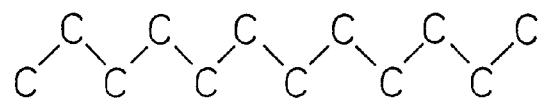
FIG. 4 is a view of a fuel molecule.
Figure 4:
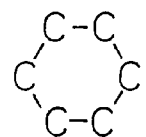
Figure 4:
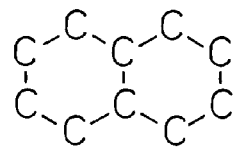

Second, when the amount of smoke produced, that is, the amount of soot produced, becomes substantially zero, as shown in FIG. 2, the amounts of HC and CO increase. This means that the hydrocarbons are exhausted without growing into soot. That is, the straight chain hydrocarbons and aromatic hydrocarbons contained in the fuel and shown in FIG. 4 decompose when raised in temperature in an oxygen poor state resulting in the formation of a precursor of soot. Next, soot mainly comprised of solid masses of carbon atoms is produced. In this case, the actual process of production of soot is complicated. How the precursor of soot is formed is not clear, but whatever the case, the hydrocarbons shown in FIG. 4 grow to soot through the soot precursor. Therefore, as explained above, when the amount of production of soot becomes substantially zero, the amount of exhaust of HC and CO increases as shown in FIG. 2, but the HC at this time is a soot precursor or a state of hydrocarbons before that.

Summarizing these considerations based on the results of the experiments shown in FIG. 2 and FIGS. 3A and 3B, when the combustion temperature in the combustion chamber 5 is low, the amount of soot produced becomes substantially zero. At this time, a soot precursor or a state of hydrocarbons before that is exhausted from the combustion chamber 5. More detailed experiments and studies were conducted an this. As a result, it was learned that when the temperatures of the fuel and the gas around the fuel in the combustion chamber 5 are below a certain temperature, the process of growth of soot stops midway, that is, no soot at all is produced and that when the temperature of the fuel and its surroundings in the combustion chamber 5 becomes higher than a certain temperature, soot is produced.

The temperature of the fuel and its surroundings when the process of production of hydrocarbons stops in the state of the soot precursor, that is, the above certain temperature, changes depending on various factors such as the type of the fuel, the air fuel ratio, and the compression ratio, so it cannot be said what degree it is, but this certain temperature is deeply related with the amount of production of NOx. Therefore, this certain temperature can be defined to a certain degree from the amount of production of NOx. That is, the greater the EGR rate, the lower the temperature of the fuel and the gas surrounding it at the time of combustion and the lower the amount of NOx produced. At this time, when the amount of NOx produced becomes around 10 ppm or less, almost no soot is produced any more. Therefore, the above certain temperature substantially matches the temperature when the amount of NOx produced becomes 10 ppm or less.

Once soot is produced, it is impossible to remove it by after-treatment using an oxidation catalyst etc. As opposed to this, a soot precursor or a state of hydrocarbons before this can be easily removed by after-treatment using an oxidation catalyst etc. Considering after-treatment by an oxidation catalyst etc., there is an extremely great difference between whether the hydrocarbons are exhausted from the combustion chamber 5 in the form of a soot precursor or a state before that or exhausted from the combustion chamber 5 in the form of soot. The new combustion system used in the present invention is based on the idea of exhausting the hydrocarbons from the combustion chamber 5 in the form of a soot precursor or a state before that without allowing the production of soot in the combustion chamber 5 and causing the hydrocarbons to oxidize by an oxidation catalyst etc.

Now, to stop the growth of hydrocarbons in the state before the production of soot, it is necessary to suppress the temperatures of the fuel and the gas around it at the time of combustion in the combustion chamber 5 to a temperature lower than the temperature where soot is produced. In this case, it was learned that the heat absorbing action of the gas around the fuel at the time of combustion of the fuel has an extremely great effect in suppression of the temperatures of the fuel and the gas around it.

That is, if there is only air around the fuel, the vaporized fuel will immediately react with the oxygen in the air and burn. In this case, the temperature of the air away from the fuel does not rise that much. Only the temperature around the fuel becomes locally extremely high. That is, at this time, the air away from the fuel does not absorb the heat of combustion of the fuel much at all. In this case, since the combustion temperature becomes extremely high locally, the unburned hydrocarbons receiving the heat of combustion produce soot.

On the other hand, when there is fuel in a mixed gas of a large amount of inert gas and a small amount of air, the situation is somewhat different. In this case, the evaporated fuel disperses in the surroundings and reacts with the oxygen mixed in the inert gas to burn. In this case, the heat of combustion is absorbed by the surrounding inert gas, so the combustion temperature no longer rises that much. That is, it becomes possible to keep the combustion temperature low. That is, the presence of inert gas plays an important role in the suppression of the combustion temperature. It is possible to keep the combustion temperature low by the heat absorbing action of the inert gas.

In this case, to suppress the temperatures of the fuel and the gas around it to a temperature lower than the temperature at which soot is produced, an amount of inert gas enough to absorb an amount of heat sufficient for lowering the temperatures is required. Therefore, if the amount of fuel increases, the amount of inert gas required increases along with the same. Note that in this case the larger the specific heat of the inert gas, the stronger the heat absorbing action. Therefore, the inert gas is preferably a gas with a large specific heat. In this regard, since $CO_2$ and EGR gas have relatively large specific heats, it may be said to be preferable to use EGR gas as the inert gas.

Figure 5:
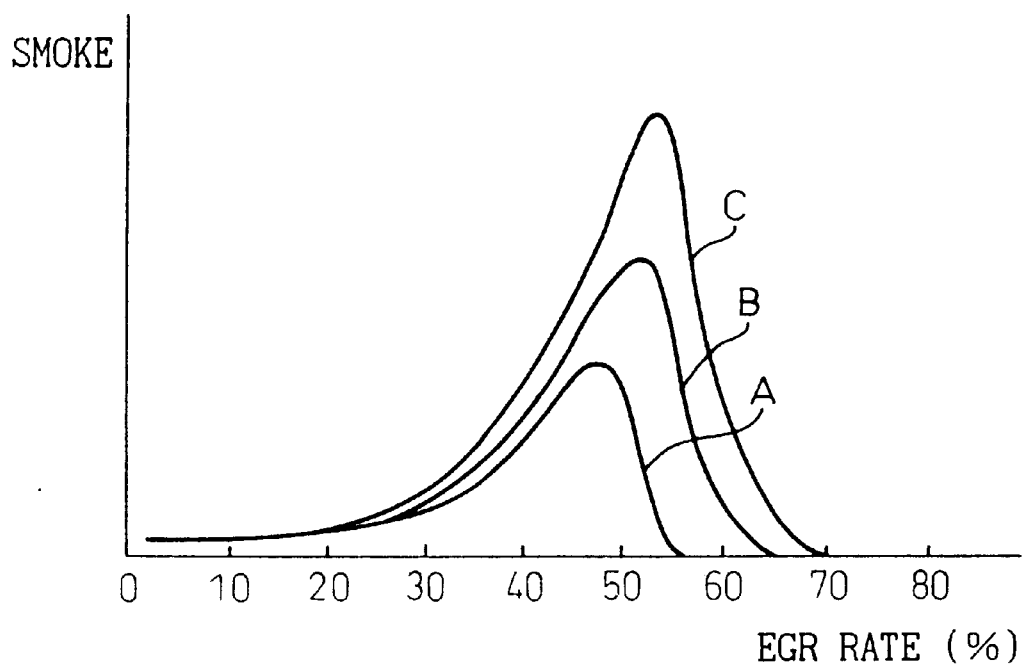
FIG. 5 is a view of the relationship between the amount of generation of smoke and the EGR rate.

FIG. 5 shows the relationship between the EGR rate and smoke when using EGR gas as the inert gas and changing the degree of cooling of the EGR gas. That is, the curve A in FIG. 5 shows the case of force cooling the EGR gas and maintaining the temperature of the EGR gas at about 90° C., curve B shows the case of cooling the EGR gas by a compact cooling apparatus, and curve C shows the case of not force cooling the EGR gas.

When force cooling the EGR gas as shown by the curve A in FIG. 5, the amount of soot produced peaks when the EGR rate is a little under 50 percent. In this case, if the EGR rate is made about 55 percent or higher, almost no soot is produced any longer.

On the other hand, when the EGR gas is slightly cooled as shown by curve B in FIG. 5, the amount of soot produced peaks when the EGR rate is slightly higher than 50 percent. In this case, if the EGR rate is made above about 65 percent, almost no soot is produced any longer.

Further, when the EGR gas is not force cooled as shown by curve C in FIG. 5, the amount of soot produced peaks near an EGR rate near 55 percent. In this case, if the EGR rate is made over about 70 percent, almost no soot is produced any longer.

Note that FIG. 5 shows the amount of smoke produced when the engine load is relatively high. When the engine load becomes smaller, the EGR rate at which the amount of soot produced peaks falls somewhat and the lower limit of the EGR rate at which almost no soot is produced any longer falls somewhat. In this way, the lower limit of the EGR rate at which almost no soot is produced any longer changes in accordance with the degree of cooling of the EGR gas or the engine load.

Figure 6:
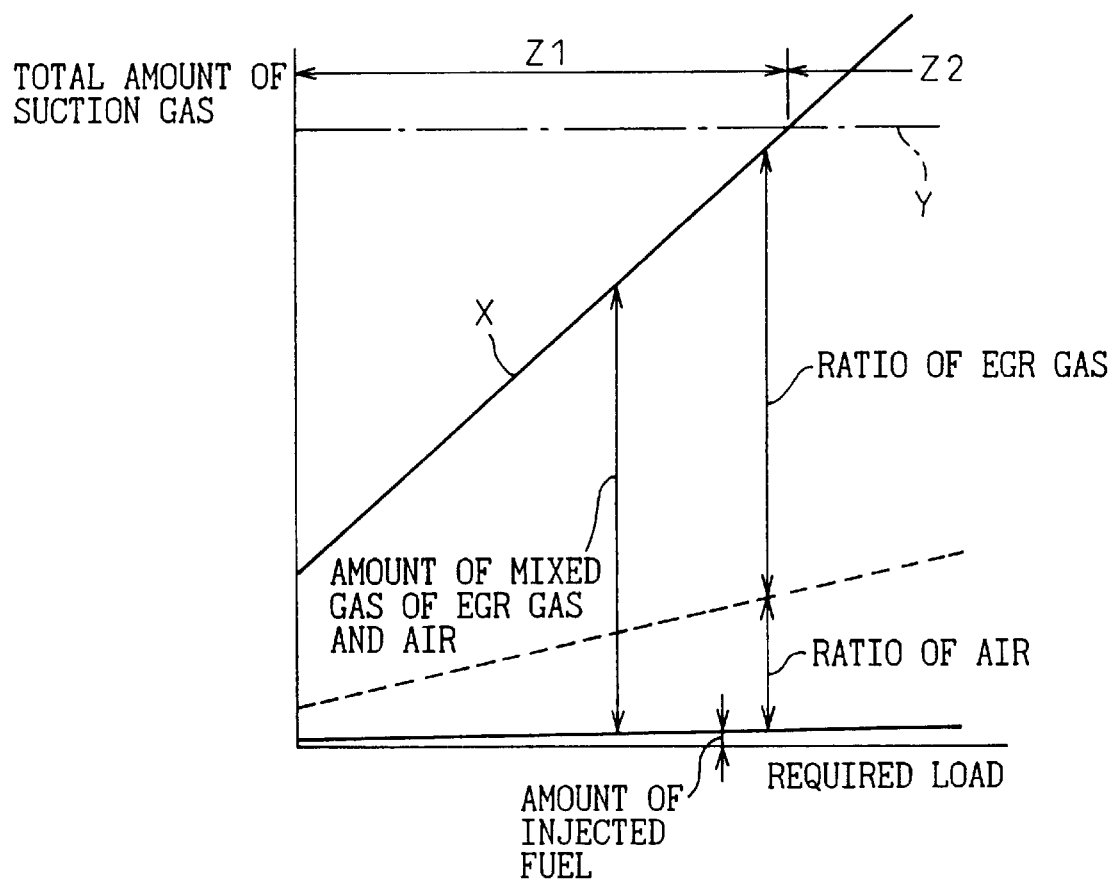
FIG. 6 is a view of the relationship between the amount of injected fuel and the amount of mixed gas.

FIG. 6 shows the amount of mixed gas of EGR gas and air, the ratio of air in the mixed gas, and the ratio of EGR gas in the mixed gas required for making the temperatures of the fuel and the gas around it at the time of combustion a temperature lower than the temperature at which soot is produced in the case of use of EGR gas as an inert gas. Note that in FIG. 6, the ordinate shows the total amount of suction gas taken into the combustion chamber 5. The broken line Y shows the total amount of suction gas able to be taken into the combustion chamber 5 when supercharging is not being performed. Further, the abscissa shows the required load. Z1 shows the low load operating region.

Referring to FIG. 6, the ratio of air, that is, the amount of air in the mixed gas, shows the amount of air necessary for causing the injected fuel to completely burn. That is, in the case shown in FIG. 6, the ratio of the amount of air and the amount of injected fuel becomes the stoichiometric air fuel ratio. On the other hand, in FIG. 6, the ratio of EGR gas, that is, the amount of EGR gas in the mixed gas, shows the minimum amount of EGR gas required for making the temperatures of the fuel and the gas around it a temperature lower than the temperature at which soot is produced. This amount of EGR gas is, expressed in terms of the EGR rate, at least 55 percent—in the embodiment shown in FIG. 6, at least 70 percent. That is, if the total amount of suction gas taken into the combustion chamber 5 is made the solid line X in FIG. 6 and the ratio between the amount of air and amount of EGR gas in the total amount of suction gas X is made the ratio shown in FIG. 6, the temperatures of the fuel and the gas around it becomes a temperature lower than the temperature at which soot is produced and therefore no soot at all is produced any longer. Further, the amount of NOx produced at this time is around 10 ppm or less and therefore the amount of NOx produced becomes extremely small.

If the amount of fuel injected increases, the amount of heat generated at the time of combustion increases, so to maintain the temperatures of the fuel and the gas around it at a temperature lower than the temperature at which soot is produced, the amount of heat absorbed by the EGR gas must be increased. Therefore, as shown in FIG. 6, the amount of EGR gas has to be increased the greater the amount of injected fuel. That is, the amount of EGR gas has to be increased as the required load becomes higher.

On the other hand, in the load region Z2 of FIG. 6, the total amount of suction gas X required for inhibiting the production of soot exceeds the total amount of suction gas Y which can be taken in. Therefore, in this case, to supply the total amount of suction gas X required for inhibiting the production of soot into the combustion chamber 5, it is necessary to supercharge or pressurize both of the EGR gas and the suction gas or the EGR gas. When not supercharging or pressurizing the EGR gas etc., in the load region Z2, the total amount of suction gas X matches with the total amount of suction gas Y which can be taken in. Therefore, in the case, to inhibit the production of soot, the amount of air is reduced somewhat to increase the amount of EGR gas and the fuel is made to burn in a state where the air fuel ratio is rich.

As explained above, FIG. 6 shows the case of combustion of fuel at the stoichiometric air fuel ratio. In the low load operating region Z1 shown in FIG. 6, even if the amount of air is made smaller than the amount of air shown in FIG. 6, that is, even if the air fuel ratio is made rich, it is possible to obstruct the production of soot and make the amount of NOx produced around 10 ppm or less. Further, in the low load region Z1 shown in FIG. 6, even if the amount of air is made greater than the amount of air shown in FIG. 6, that is, the mean value of the air fuel ratio is made a lean 17 to 18, it is possible to obstruct the production of soot and make the amount of NOx produced around 10 ppm or less.

That is, when the air fuel ratio is made rich, the fuel becomes in excess, but since the fuel temperature is suppressed to a low temperature, the excess fuel does not grow into soot and therefore soot is not produced. Further, at this time, only an extremely small amount of NOx is produced. On the other hand, when the mean air fuel ratio is lean or when the air fuel ratio is the stoichiometric air fuel ratio, a small amount of soot is produced if the combustion temperature becomes higher, but in the present invention, the combustion temperature is suppressed to a low temperature, so no soot at all is produced. Further, only an extremely small amount of NOx is produced.

In this way, in the engine low load operating region Z1, regardless of the air fuel ratio, that is, whether the air fuel ratio is rich or the stoichiometric air fuel ratio or the mean air fuel ratio is lean, no soot is produced and the amount of NOx produced becomes extremely small. Therefore, considering the improvement of the fuel consumption rate, it may be said to be preferable to make the mean air fuel ratio lean.

To simultaneously reduce the soot and the NOx in the new combustion system used in the present invention, however, it is necessary to make the EGR rate at least about 55 percent. The EGR rate, however, can only be made over 55 percent or so when the amount of intake air is small, that is, when the engine load is relatively light. If the amount of intake air exceeds a certain limit, that is, if the required load becomes higher than a certain limit, it no longer becomes possible to increase the amount of intake air unless reducing the EGR rate. In this case, however, in the example of the experiment shown in FIG. 2, if gradually reducing the EGR rate from about 65 percent along with the increase of the amount of intake air, that in, along with the increase in the required load, that is, if gradually increasing the air-fuel ratio along with the increase in the required load, a large amount of smoke is produced. Therefore, when the required load exceeds a certain limit, it is not possible to gradually reduce the EGR rate from about 65 percent or gradually increase the air-fuel ratio along with the rise in the required load.

In this case, to obstruct the production of a large amount of smoke, when the required load exceeds the certain limit, it is necessary to jump over the range of the EGR rate of about 40 percent to about 65 percent where the large amount of smoke is produced. Therefore, in the present invention, when the required load is low, the EGR rate is maintained at least at about 55 percent, while when the required load becomes higher and it is no longer possible to maintain the EGR rate at least at about 55 percent, the EGR rate is reduced in a step-like manner to below about 50 percent. At this time, the air-fuel ratio becomes larger in a step-like manner as well.

When the EGR rate is at least about 55 percent, as explained before, the temperature of the fuel and the gas surrounding it becomes a temperature lower than the temperature where soot is produced. At this time, first combustion, that is, low temperature combustion, is performed. As opposed to this, when the EGR rate is made to fall to below about 50 percent, the temperature of the fuel and the gas surrounding it becomes higher than the temperature at which soot is produced. At this time, of course, first combustion, that is, low temperature combustion, cannot be performed. In the embodiment according to the present invention, when low temperature combustion cannot be performed in this way, second combustion, that is, the conventionally performed combustion, is performed. Note that the first combustion, that is, the low temperature combustion, as clear from the explanation up to here, means combustion where the amount of inert gas in the combustion chamber is larger than the amount of inert gas where the amount of production of the soot peaks and where almost no soot is produced, while the second combustion, that is, the conventionally normally performed combustion, means combustion where the amount of inert gas in the combustion chamber is smaller than the amount of inert gas where the amount of production of soot peaks.

Figure 7:
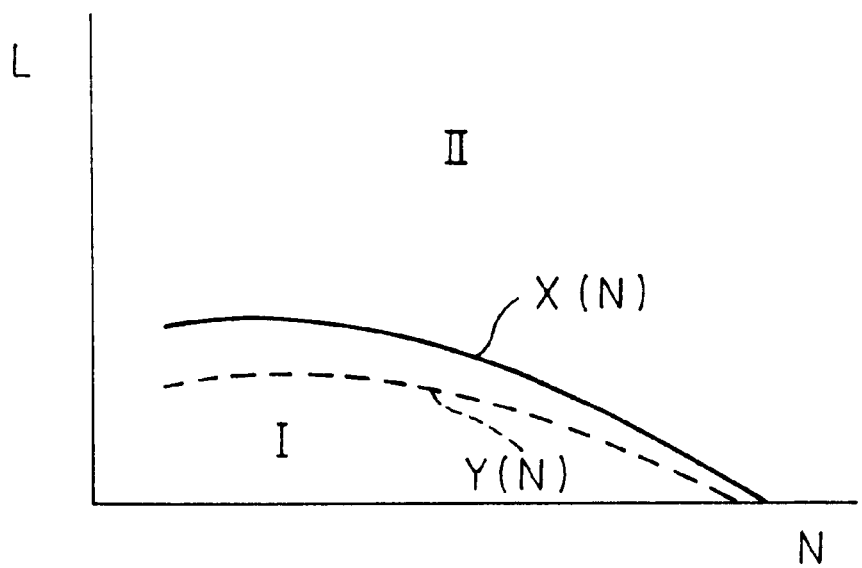
FIG. 7 is a view of a first operating region I and a second operating region II.

FIG. 7 shows a first operating region I where the first combustion, that is, the low temperature combustion, where the EGR rate is made at least about 55 percent is performed and a second operating region II where the second combustion, that is, the combustion by the conventional combustion method, where the EGR rate is made less than about 50 percent is performed. Note that in FIG. 7, the abscissa shows the amount of depression of the accelerator pedal 40, that is, the required load, and the ordinate shows the engine rotational speed N. Further, in FIG. 7, X(N) shows a first boundary between the first operating region I and the second operating region II, and Y(N) shows a second boundary between the first operating region I and the second operating region II. The change of operating regions from the first operating region I to the second operating region II is judged based on the first boundary X(N), while the change of operating regions from the second operating region II to the first operating region I is judged based on the second boundary Y(N).

That is, in the first operating region I of the engine where the first combustion, that is, the low temperature combustion, is being performed, if the required load L exceeds the first boundary X(N), which is a function of the engine rotational speed N, it is judged that the operating region has shifted to the second operating region II and the second combustion is switched to. Next, when the required load L becomes lower than the second boundary Y(N), which is a function of the engine rotational speed N, it is judged that the operating region has shifted to the first operating region I and the second combustion is switched to the first combustion.

Two boundaries were provided, that is, the first boundary X(N) and the second boundary Y(N) at the lower load side of the first boundary X(N), in this way for the following two reasons. The first reason is that at the high load side of the second operating region II, the combustion temperature is relatively high and at this time, even if the required load L becomes lower than the first boundary X(N), low temperature combustion cannot be performed immediately. That is, low temperature combustion cannot be started immediately unless the required load L is considerably low, that is, lower than the second boundary Y(N). The second reason is to provide hysteresis with respect to the change in operating regions between the first operating region I and the second operating region II.

When low temperature combustion is being performed when the engine is operating in the first operating region I, almost no soot is produced, but instead the unburnt hydrocarbons are exhausted from the combustion chamber 5 in the form of a soot precursor or a gate before that. At this time, the unburnt hydrocarbons exhausted from the combustion chamber 5 may be oxidized well by a catalyst 19 having an oxidation action.

As the catalyst 19, an oxidation catalyst, three-way catalyst, or NOx absorbent may be used. An NOx absorbent has the function of absorbing the NOx when the mean air-fuel ratio in the combustion chamber 5 is lean and releasing the NOx when the mean air-fuel ratio in the combustion chamber 5 becomes rich.

The NOx absorbent is for example comprised of alumina as a carrier and, on the carrier, for example, at least one of potassium K, sodium Na, lithium Li, cesium Cs, and other alkali metals, barium Ba, calcium Ca, and other alkali earths, lanthanum La, yttrium Y, and other rare earths plus platinum Pt or another precious metal.

The oxidation catalyst, of course, and also the three-way catalyst and NOx absorbent have an oxidation function, therefore the three-way catalyst and NOx absorbent can be used as the catalyst 19 as explained above.

Figure 8:
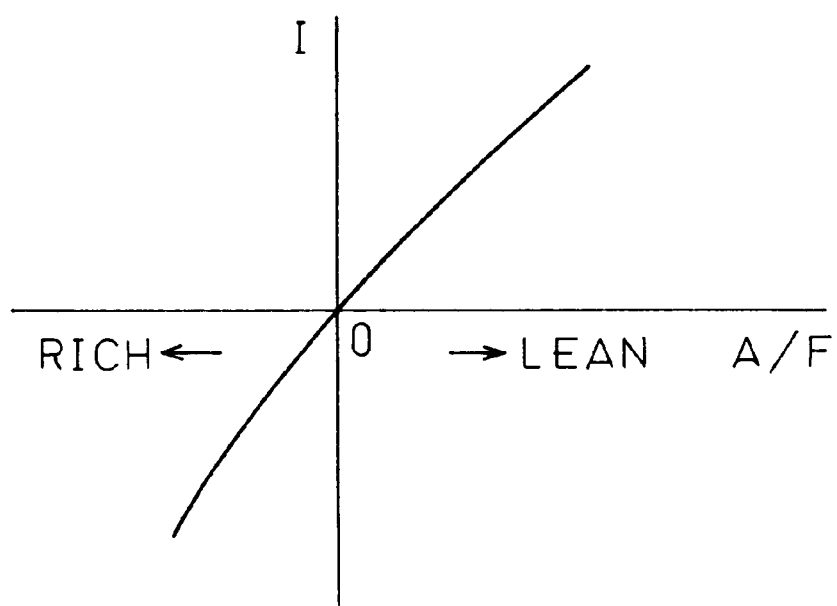
FIG. 8 is a view of the output of the air fuel ratio sensor.

FIG. 8 shows the output of the air fuel ratio sensor 21. As shown in FIG. 8, the output current I of the air fuel ratio sensor 21 changes in accordance with the air fuel ratio A/F. Therefore, it is possible to determine the air fuel ratio from the output current I of the air fuel ratio sensor 21.

Next, an explanation will be made of a specific example of the control of the operation in the first operating region I and the second operating region II referring to FIG. 9.

Figure 9:
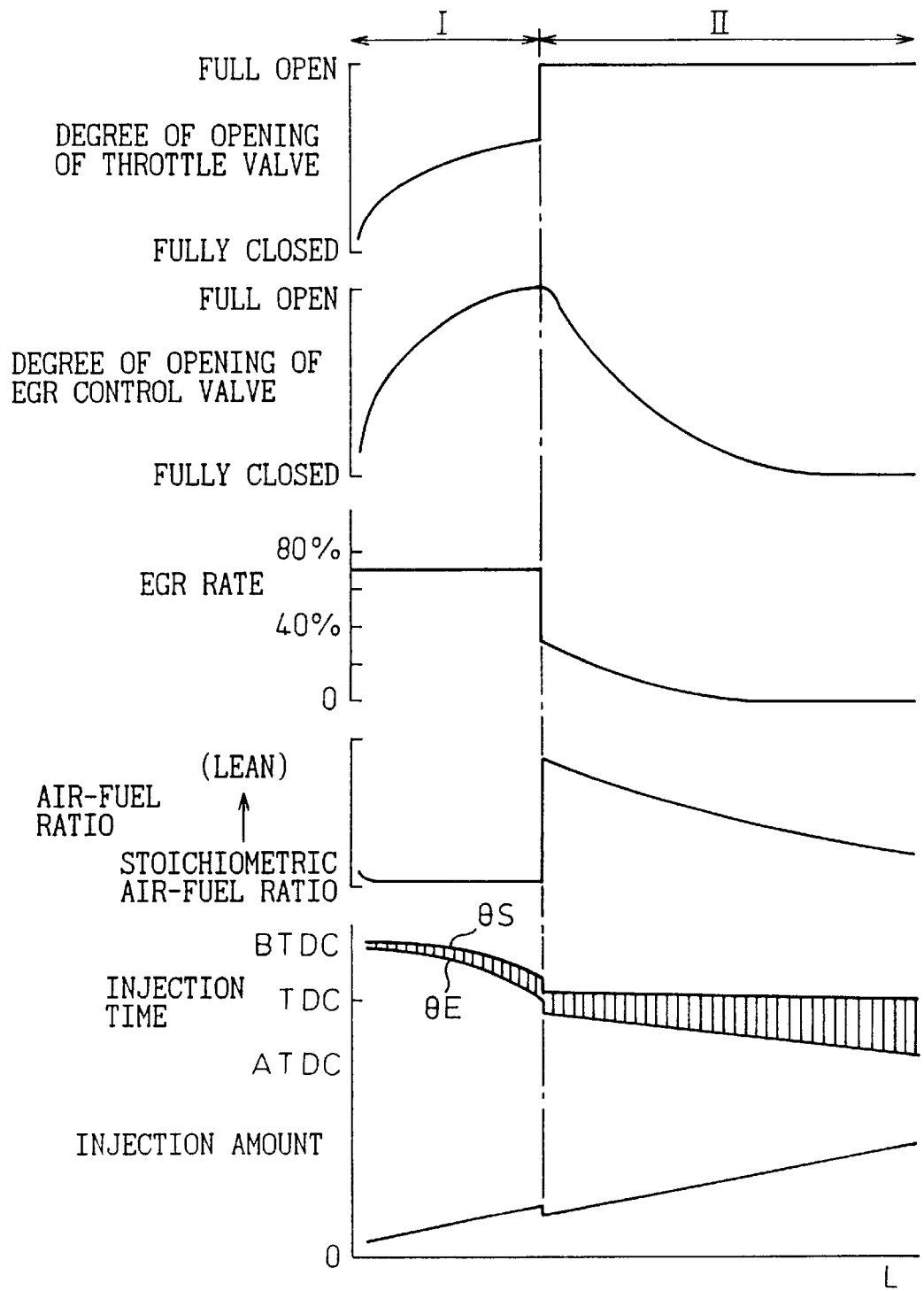
FIG. 9 is a view of the opening degree of a throttle valve etc.

FIG. 9 shows the opening degrees of the throttle valve 16, the opening degree of the EGR control valve 23, the EGR rate, the air-fuel ratio, the injection timing, and the amount of injection with respect to the required load L. As shown in FIG. 9, in the first operating region I with the low required load L, the opening degree of the throttle valve 16 is gradually increased from the fully closed state to the half opened state as the required load L becomes higher, while the opening degree of the EGR control valve 23 is gradually increased from the fully closed state to the fully opened state as the required load L becomes higher. Further, in the specific example shown in FIG. 9, in the first operating region I, the EGR rate is made about 70 percent and the air-fuel ratio is made a lean air-fuel ratio of 15 to 18 or so.

In other words, in the first operating region, the opening degree of the throttle valve 16 and the opening degree of the EGR control valve 23 are controlled so that the EGR rate becomes about 70 percent and the air-fuel ratio becomes from 15 to 18 or so. Note that at this time, the air-fuel ratio is controlled to the target air-fuel ratio by correcting the opening degree of the throttle valve 16, the opening degree of the EGR control valve 23, or the amount of fuel injected based on the output signal of the air-fuel ratio sensor 21. Further, in the first operating region I, the fuel is injected before top dead center of the compression stroke TDC. In this case, the injection start timing θS becomes later the higher the required load L. The injection end timing θE also becomes later the later the injection start timing θS.

As explained above, during idling operation, the throttle valve 16 is made to close to close to the fully closed state. At this time, the EGR control valve 23 is also made to close to close to the fully closed state. If the throttle valve 16 is closes to close to the fully closed state, the pressure in the combustion chamber 5 at the start of compression will become low, so the compression pressure will become small. If the compression pressure becomes small, the amount of compression work by the piston 4 becomes small, so the vibration of the engine body 1 becomes smaller. That is, during idling operation, the throttle valve 16 can be closed to close to the fully closed state to suppress vibration in the engine body 1.

When the engine is operating in the first operating region I, almost no soot or NOx is produced and hydrocarbons in the form of a soot precursor or its previous state contained in the exhaust gas can be oxidized by the catalyst 19.

On the other hand, it the engine operating state changes from the first operating region I to the second operating region II, the opening degree of the throttle valve 16 is increased in a step-like manner from the half opened state to the fully opened state. At this time, in the example shown in FIG. 9, the EGR rate is reduced in a step-like manner from about 70 percent to less than 40 percent and the air-fuel ratio is increased in a step-like manner. That is, the range of EGR rates where a large amount of smoke is produced is jumped over, so there is no longer a large amount of smoke produced when the engine operating state changes from the first operating region I to the second operating region II.

In the second operating region II, the second combustion, that is, the conventionally performed combustion, is performed. In this combustion method, some soot and NOx are produced, but the heat efficiency is higher than with the low temperature combustion, so if the engine operating state changes from the first operating region I to the second operating region II, the amount of injection is reduced in a step-like manner as shown in FIG. 9.

In the second operating region II, the throttle valve 16 is held in the fully opened state and the opening degree of the EGR control valve 23 is made smaller the higher the required load L. Therefore, the EGR rate becomes lower the higher the required load L and the air-fuel ratio becomes higher the higher the required load L. Even if the required load becomes high, however, the air-fuel ratio is made a lean air-fuel ratio. Further, in the second operating region II, the injection start timing θS is made close to top dead center of the compression stroke TDC.

Next, an explanation will be given of the control of the operation with reference to FIG. 10.

Figure 10:
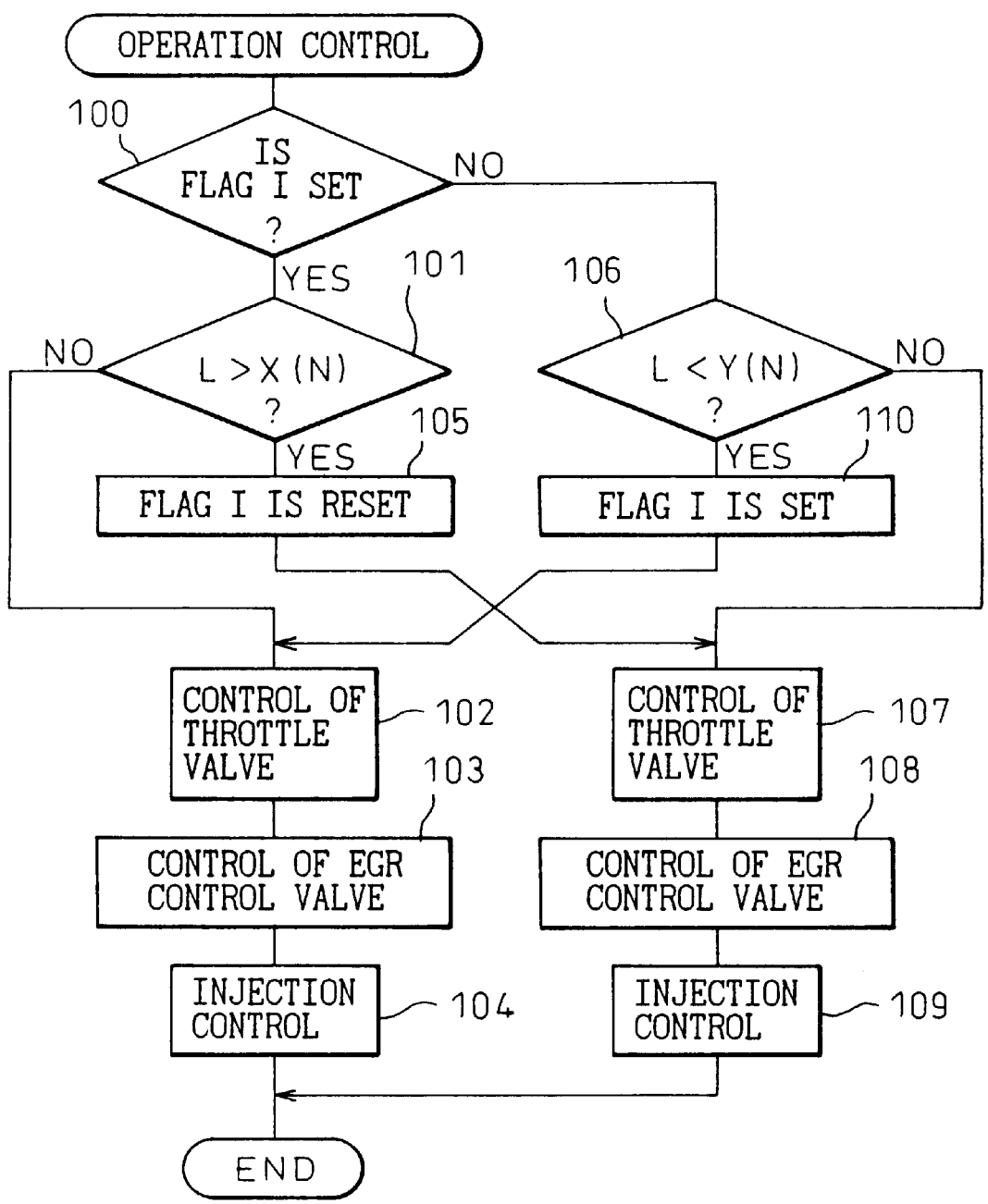
FIG. 10 is a flow chart of the control of the engine operation.

Referring to FIG. 10, first, at step 100, it is judged if a flag I showing that the engine operating region is the first operating region I is set or not. When the flag I is set, that is, when the engine operating region is the first operating region I, the routine proceeds to step 101, where it is judged if the required load L has become larger than the boundary X(N) shown in FIG. 7 or not.

When L≦X(N), the routine proceeds to step 102, where the opening degree of the throttle valve 16 is controlled to the opening degree in accordance with the required load L shown in the operating region I of FIG. 9. Next, at step 103, the opening degree of the EGR control valve 23 is controlled to the opening degree in accordance with the required load L shown in the first operating region I of FIG. 9. Next, at step 104, the amount of injection, the injection start timing θS, and the injection end timing θE in accordance with the required load L etc. shown in the first operating region I of FIG. 9 are found and the fuel is injected based on the same.

On the other hand, when it is judged at step 101 that L>X(N), the routine proceeds to step 105, where the flag I is reset. Next, the routine proceeds to step 107, where the opening degree of the throttle valve 16 is controlled to an opening degree in accordance with the required load L of the second operating region II shown in FIG. 9. That is, the throttle valve 16 is made to fully open. Next, at step 108, the opening degree of the EGR control valve 23 is controlled to an opening degree in accordance with the required load L shown in the second operating region II of FIG. 9. Next, at step 109, the amount of injection, the injection start timing θS, and the injection end timing θE in accordance with the required load L etc. shown in the second operating region II of FIG. 9 are found and the fuel is injected based on the same.

On the other hand, when it is judged at step 100 that the flag I has been reset, that is, when the engine operating region is the second operating region II, the routine proceeds to step 106, where it is judged if the required load L has become smaller than the second boundary Y(N) shown in FIG. 7 or not. When L≧Y(N), the routine proceeds to step 107. As opposed to this, when L<Y(N), the routine proceeds to step 110, where the flag I is set, then proceeds to step 102.

Figure 11:
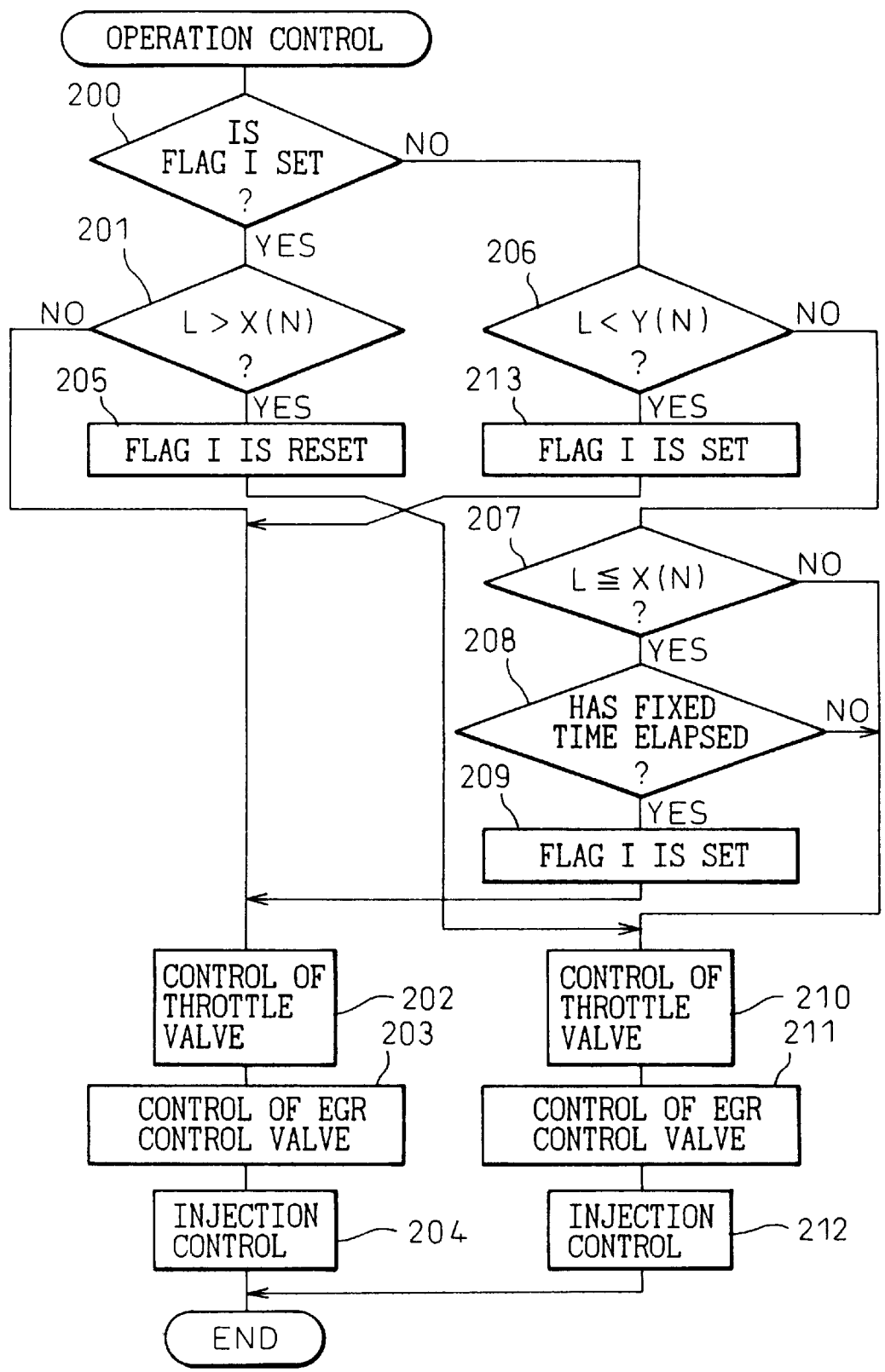
FIG. 11 is a flow chart of the control of the engine operation.

As explained above, however, at the high load side of the second operating region II, the combustion temperature is relatively high and therefore even if the required load L becomes lower than the first boundary X(N), if higher than the second boundary Y(N), low temperature combustion cannot be performed immediately. If the engine operating state continues for at least a certain time between the first boundary X(N) and the second boundary Y(N), the temperature in the combustion chamber 5 also becomes lower and therefore low temperature combustion can be performed. Therefore, in the second embodiment of the present invention, when the engine operating state is the second operating region II and continues for at least a certain time between the first boundary X(N) and the second boundary Y(N), it is deemed that the operating region has changed from the second operating region II to the first operating region I and the low temperature combustion is started. FIG. 11 is a flow chart of this second embodiment.

Referring to FIG. 11, first, at step 200, it is judged if a flag I showing that the engine operating region is the first operating region I in set or not. When the flag I is set, that is, when the engine operating region is the first operating region I, the routine proceeds to step 201, where it is judged if the required load L has become larger than the boundary X(N) shown in FIG. 7 or not.

When L≦X(N), the routine proceeds to step 202, where the opening degree of the throttle valve 16 is controlled to the opening degree in accordance with the required load L shown in the operating region I of FIG. 9. Next, at step 203, the opening degree of the EGR control valve 23 is controlled to the opening degree in accordance with the required load L shown in the first operating region I of FIG. 9. Next, at step 204, the amount of injection, the injection start timing θS, and the injection end timing θE in accordance with the required load L etc. shown in the first operating region I of FIG. 9 are found and the fuel is injected based on the same.

On the other hand, when it is judged at step 201 that L>X(N), the routine proceeds to step 205, where the flag I is reset. Next, the routine proceeds to step 210, where the opening degree of the throttle valve 16 is controlled to an opening degree in accordance with the required load L of the second operating region II shown in FIG. 9. That is, the throttle valve 16 is made to fully open. Next, at stop 211, the opening degree of the EGR control valve 23 is controlled to an opening degree in accordance with the required load L shown in the second operating region II of FIG. 9. Next, at step 212, the amount of injection, the injection start timing θS, and the injection end timing θE in accordance with the required load L etc. shown in the second operating region II of FIG. 9 are found and the fuel is injected based on the same.

On the other hand, when it is judged at step 200 that the flag I has been reset, that is, when the engine operating region is the second operating region II, the routine proceeds to step 206, where it is judged if the required load L has become smaller than the second boundary Y(N) shown in FIG. 7 or not. When L≧Y(N), the routine proceeds to stop 207, where it is judged if the required load L is lower than the first boundary X(N) or not, that is, if the required load L is between the first boundary X(N) and the second boundary Y(N).

When L>X(N), the routine proceeds to step 210. As opposed to this, when L≦X(N), that is, when Y(N)≦L≦X(N), the routine proceeds to step 208, where it is judged if a predetermined time has elapsed or not. When the predetermined time has not elapsed, the routine proceeds to step 210. As opposed to this, when the predetermined time has elapsed, that is, when the state where Y(N)≦L≦X(N) continues for more than the predetermined time, the routine proceeds to step 209, where the flag I is set. Next, the routine proceeds to step 202, where the low temperature combustion is started.

On the other hand, when it is Judged at step 206 that L<Y(N), the routine proceeds to step 213, where the flag I is set. Next, the routine proceeds to step 202, where the low temperature combustion is performed.

Figure 12:
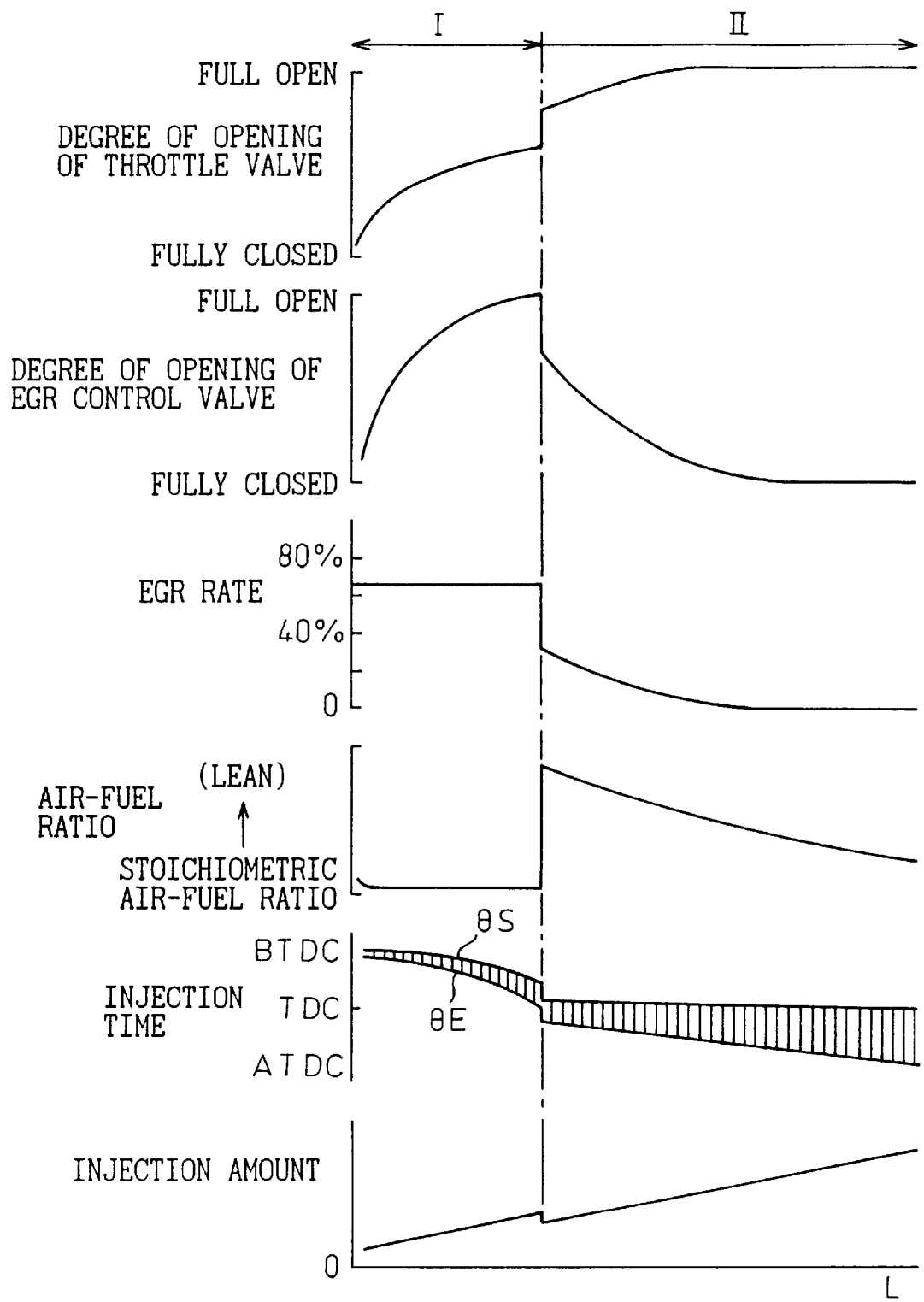
FIG. 12 is a view of the opening degree of a throttle valve etc.

FIG. 12 shows a third embodiment. In this embodiment, when the operating region changes from the first operating region I to the second operating region II, both of the opening degree of the throttle valve 16 and the opening degree of the EGR control valve 23 are made to change in a step-like manner to reduce the EGR rate from about 65 percent to less than 40 percent. That is, in this embodiment, when the operating region changes from the first operating region I to the second operating region II, the opening degree of the throttle valve 16 is made to increase in a step-like manner, while the opening degree of the EGR control valve 23 is made to fall in a step-like manner. Note that in this embodiment, in the low load region of the second operating region II, the opening degree of the throttle valve 16 is made to gradually increase as the required load L becomes higher.

FIG. 13 to FIG. 17 show a fourth embodiment. In this embodiment, in the low load region of the second operating region II shown in FIG. 7, a small amount of fuel is injected in the initial part of the suction stroke and the major part of the fuel is injected near top dead center of the compression stroke TDC, that is, VIGOM injection is performed.

Figure 13:
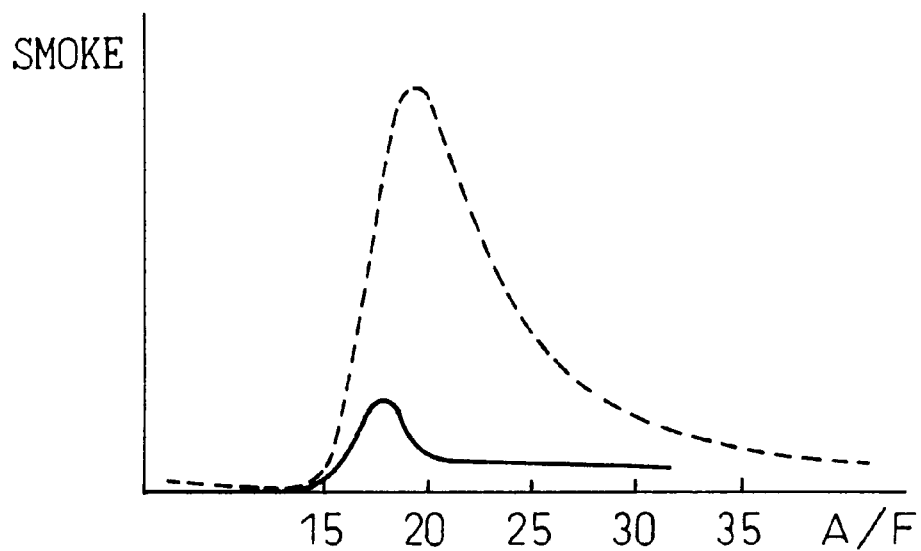
FIG. 13 is a view of the amount of generation of smoke.

In FIG. 13, the broken line shows the amount of smoke produced when injecting fuel at the end phase of the compression stroke, while the solid line shows the amount of smoke produced with VIGOM injection. As shown in FIG. 13, with VIGOM injection, the amount of smoke produced becomes small and the range of air-fuel ratio where smoke is produced becomes narrower. If the range of air-fuel ratio where smoke is produced becomes narrower, the amount of change of the EGR rate required for jumping over the range of air-fuel ratio where smoke is produced becomes smaller, therefore there is the advantage that control of the opening degree of the throttle valve 16 or control of the opening degree of the EGR control valve 23 for jumping over the range of air-fuel ratio where smoke is produced becomes easier.

Figure 14:
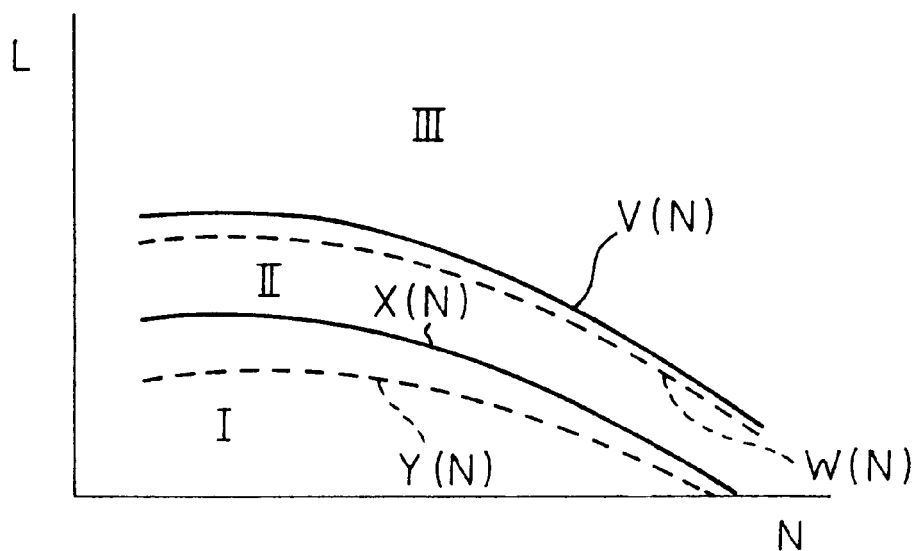
FIG. 14 is a view of the first operating region I, a low load side operating region II, and a high load side operating region III.

FIG. 14 shows the divisions of the operating regions in the fourth embodiment. In FIG. 14, the first operating region I where low temperature combustion is performed the first boundary X(N), and the second boundary Y(N) are the same as the first operating region I, the first boundary X(N), and the second boundary Y(N) shown in FIG. 7. As opposed to this, the second operating region II shown in FIG. 7 is divided into the low load side operating region II and the high load side operating region III in the fourth embodiment. At the low load side operating region II, VIGOM injection is performed, while at the high load side operating region III, the conventionally performed normal injection is performed.

Note that as shown in FIG. 14, in this embodiment, two boundaries, that is, a third boundary V(N) and a fourth boundary W(N), are set between the low load side operating region II and the high load side operating region III. In this case, the change of operating regions from the low load side operating region II to the high load side operating region III is judged based on the third boundary V(N), while the change of operating regions from the high load side operating region III to the low load side operating region II is judged based on the fourth boundary W(N).

Figure 15:
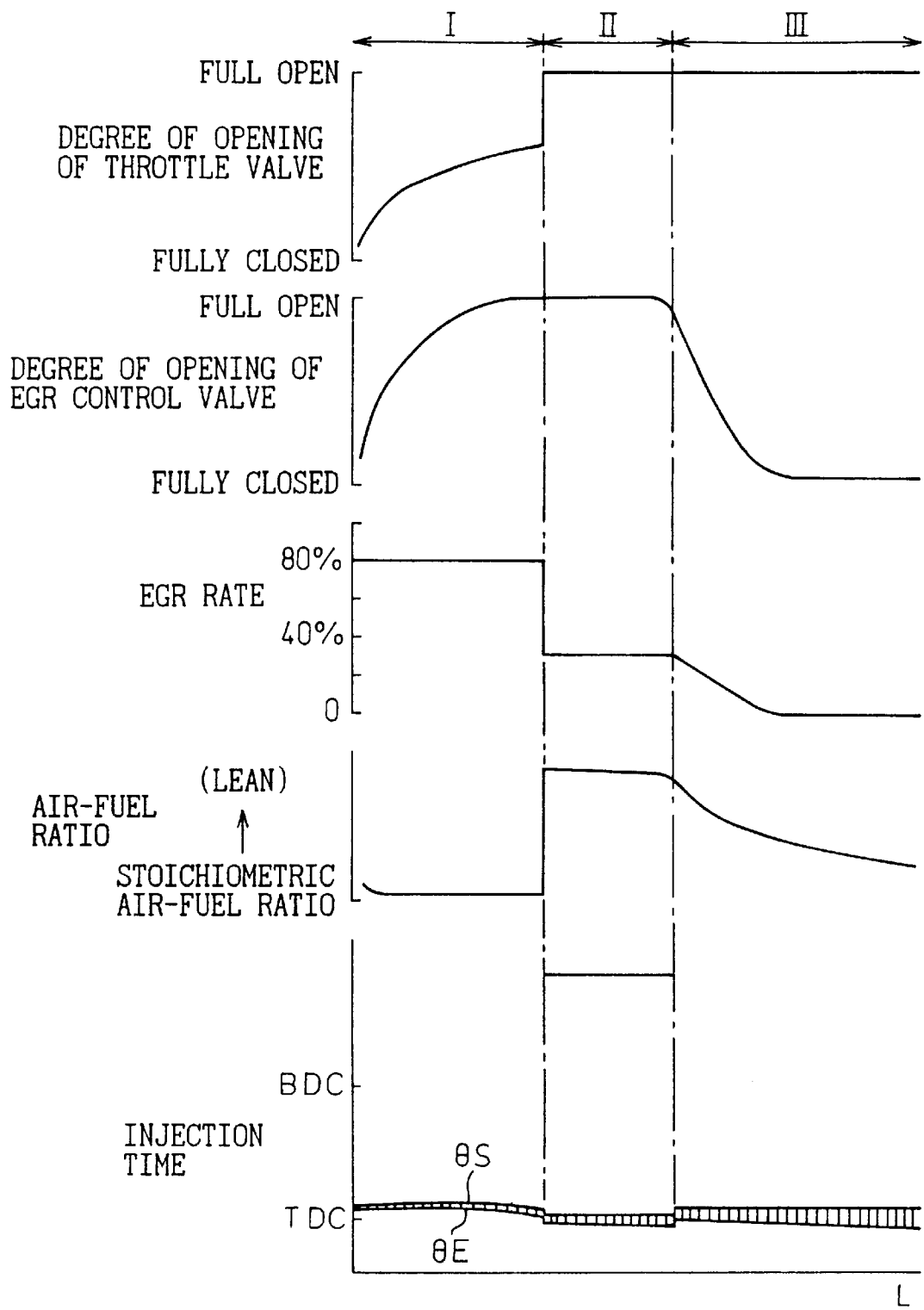
FIG. 15 is a view of the opening degree of a throttle valve etc.

FIG. 15 shows the opening degrees of the throttle valve 16, the opening degree of the EGR control valve 23, the EGR rate, the air-fuel ratio, and the injection timing with respect to the required load L. As shown in FIG. 15, in the first operating region I where the low temperature combustion is performed, the opening degree of the throttle valve 16 is gradually increased from close to the fully closed state to the half opened state as the required load L becomes higher, while the opening degree of the EGR control valve 23 is gradually increased from close to the fully closed state to the fully opened state as the required load L becomes higher. Further, in the embodiment shown in FIG. 15, in the first operating region I, the EGR rate is made about 80 percent and the air-fuel ratio is made a slightly lean air-fuel ratio.

On the other hand, if the operating region changes from the first operating region I where low temperature combustion is performed to the low load side operating region II, the opening degree of the throttle valve 16 is increased in a step-like manner from the half opened state to the fully opened state. At this time, in the example shown in FIG. 15, the EGR rate is reduced in a step-like manner from about 80 percent to less than 40 percent and the air-fuel ratio is increased in a step-like manner. That is, the range of EGR rates where a large amount of smoke is produced is jumped over, so a large amount of smoke is no longer produced when the engine operating region changes from the first operating region I to the low load side operating region II.

At the low load side operating region II, VIGOM injection is performed. In this low load side operating region II, the throttle valve 16 is held in the fully opened state and the opening degree of the EGR control valve 23 is held at substantially a constant opening degree. Therefore, in the low load side operating region II, the EGR rate is held substantially constant, and the air-fuel ratio becomes small as the required load L becomes high. Further, a small amount of fuel is injected at the initial phase of the suction stroke, while the majority of the fuel is injected near top dead center of the compression stroke TDC.

When the operating region changes from the low load side operating region II where VIGOM injection is performed to the high load side operating region III where conventionally performed normal injection is performed, the opening degree of the throttle valve 16 and the opening degree of the EGR control valve 23 do not sharply change, therefore the EGR rate and the air-fuel ratio do not sharply change. At the high load side operating region III, the throttle valve 16 is held in the fully opened state, while the opening degree of the EGR control valve 23 is made smaller the higher the required load L. Therefore, the EGR becomes lower the higher the required load L and the air-fuel ratio becomes smaller the higher the required load L.

Next, an explanation will be given of the control of the operation referring to FIG. 16 and FIG. 17.

Figure 16:
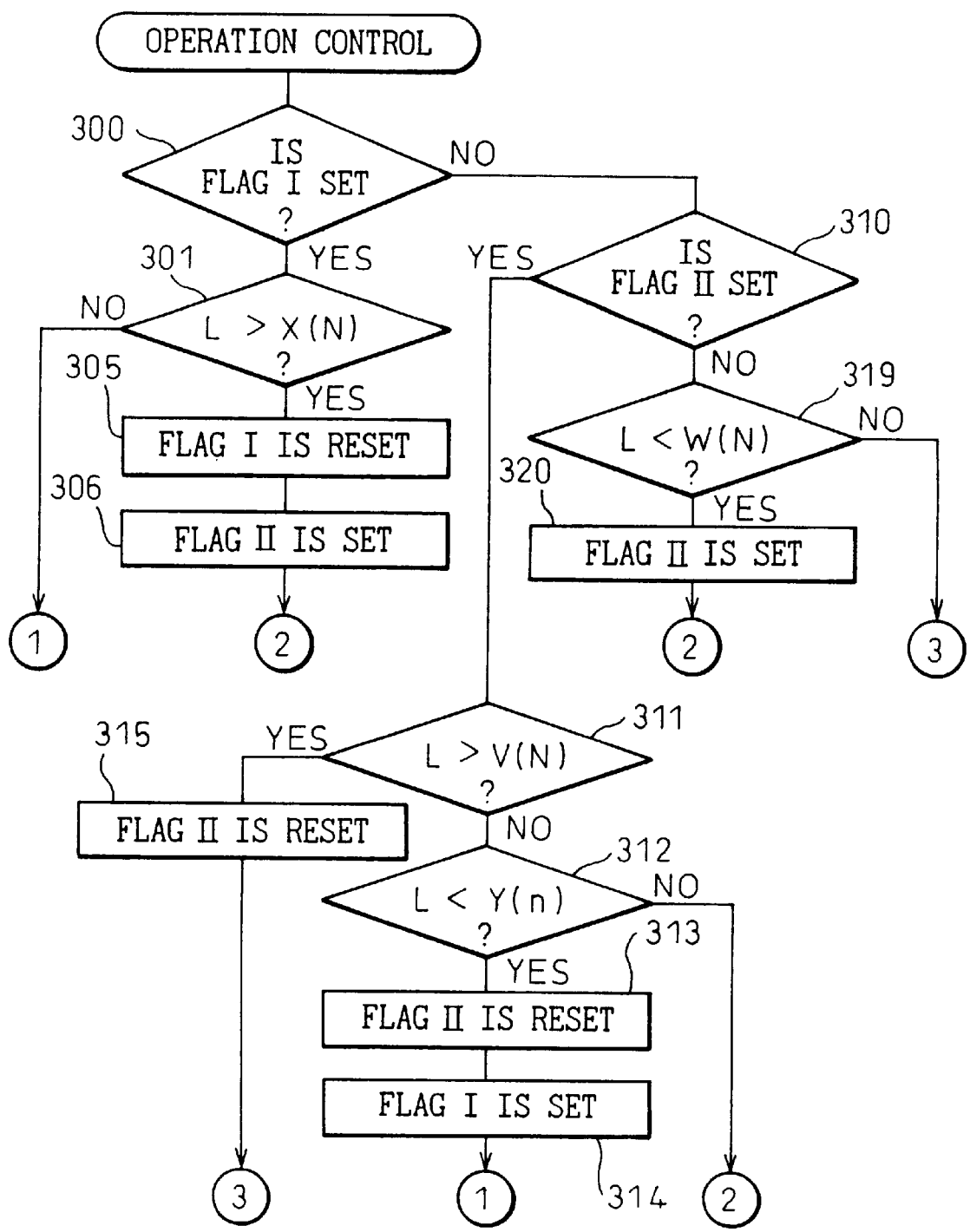
FIG. 16 and FIG. 17 are flow charts of the control of the engine operation.
Figure 17:
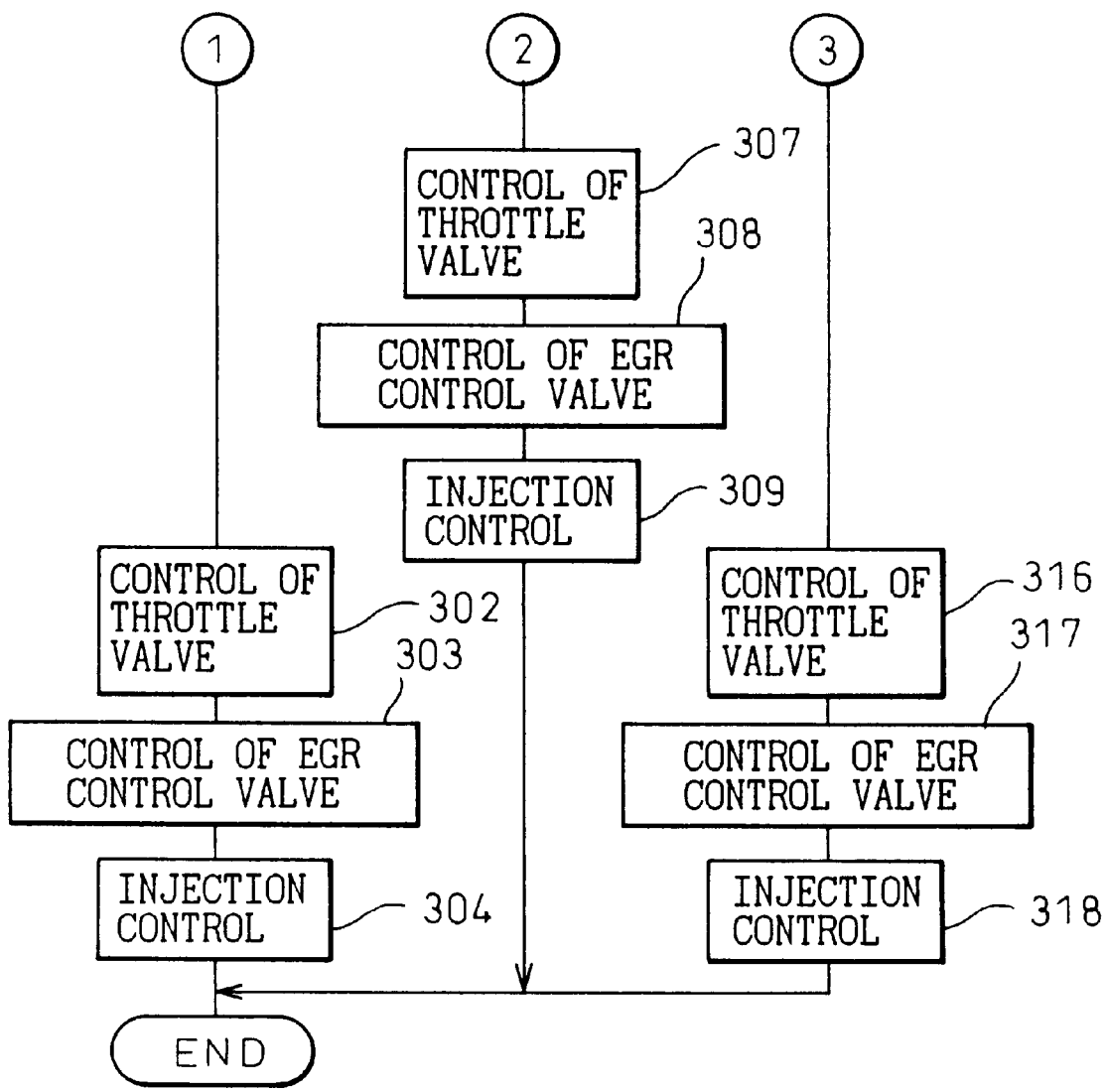

Referring to FIG. 16 and FIG. 17, first, at step 300, it is judged if a flag I showing that the engine operating region is the first operating region I is set or not. When the flag I is set, that is, when the engine operating region is the first operating region I, the routine proceeds to step 301, where It is judged if the required load L has become larger than the boundary X(N) shown in FIG. 7 or not.

When $L \leq X(N)$, the routine proceeds to step 302, where the opening degree of the throttle valve 16 is controlled to the opening degree in accordance with the required load L shown in the operating region I of FIG. 15. Next, at step 303, the opening degree of the EGR control valve 23 is controlled to the opening degree in accordance with the required load L shown in the first operating region I of FIG. 15. Next, at step 304, the injection start timing θS and the injection end timing θE in accordance with the required load L etc. shown in the first operating region I of FIG. 15 are found and the fuel is injected based on the same.

On the other hand, when it is judged at step 301 that $L > X(N)$, the routine proceeds to step 305, where the flag I is reset. Next, the routine proceeds to step 306, where a flag II showing that the operating region is the low load side operating region II is set. Next, the routine proceeds to step 307, where the opening degree of the throttle valve 16 is controlled to an opening degree in accordance with the required load L of the low load side operating region II shown in FIG. 15. That is, the throttle valve 16 is made to fully open. Next, at step 308, the opening degree of the EGR control valve 23 is controlled to an opening degree in accordance with the required load L shown in the low load side operating region II of FIG. 15. Next, at step 309, the injection start timing θS and the injection end timing θE in accordance with the required load L etc. shown in the low load side operating region II of FIG. 15 are found and the fuel is injected based on the same.

On the other hand, when it is judged at step 300 that the flag I has been reset, the routine proceeds to stop 310, where it is judged if the flag II has been set or not. When the flag II has been set, that is, when the operating region is the low load side operating region II, the routine proceeds to step 311, where it is judged if the required load L has become larger than the third boundary V(N) shown in FIG. 14 or not. When $L \leq V(N)$, the routine proceeds to step 312, where it is judged if the required load L has become smaller than the second boundary Y(N) or not. When $L \geq Y(N)$, the routine proceeds to step 307, where VIGOM injection is performed.

As opposed to this, when it is judged that $L < Y(N)$, the routine proceeds to step 313, where the flag I is set. Next, the routine proceeds to step 302, where the low temperature combustion is performed.

On the other hand, when it is judged at step 311 that $L > V(N)$, the routine proceeds to step 315, where the flag II is reset. Next, the routine proceeds to step 316, where the opening degree of the throttle valve 16 is controlled to an opening degree in accordance with the required load L shown in the high load side operating region III of FIG. 15. That is, the throttle valve 16 is held in the fully opened state. Next, at step 317, the opening degree of the EGR control valve 23 is controlled to an opening degree in accordance with the required load L shown in the high load side operating region III of FIG. 15. Next, at step 318, the injection start timing θS and the injection end timing θE in accordance with the required load L etc. shown in the high load side operating region III of FIG. 15 are found and fuel is injected based on the same.

On the other hand, when it is judged at step 310 that the flag II is reset, that is, when the operating region is the high load side operating region III, the routine proceeds to step 319, where it is judged if the required load L has become lower than the fourth boundary W(N) shown in FIG. 14. When $L \geq (N)$, the routine proceeds to step 316. As opposed to this, when $L < W(N)$, the routine proceeds to step 320, where the flag II is set, then proceeds to step 307. Therefore, VIGOM injection is performed at this time.

According to the present invention, as mentioned above, it is possible to reduce to an extremely small amount the production of soot and NOx when the engine is operating at a light load.

While the invention has been described by reference to specific embodiments chosen for purposes of illustration, it should be apparent that numerous modifications could be made thereto by those skilled in the art without departing from the basic concept and scope of the invention.

We claim:

1. An internal combustion engine in which an amount of production of soot gradually increases and then peaks when an amount of recirculated exhaust gas supplied in a combustion chamber increases and in which a further increase of the amount of recirculated exhaust gas supplied in the combustion chamber results in a temperature of fuel and surrounding gas in the combustion chamber becoming lower than a temperature of production of soot and therefore almost no production of soot any longer, said engine comprising:

switching means for selectively switching between a first combustion where the amount of the recirculated exhaust gas supplied to the combustion chamber is larger than the amount of recirculated exhaust gas where the amount of production of soot peaks and almost no soot is produced and a second combustion where the amount of recirculated exhaust gas supplied to the combustion chamber is smaller than the amount of recirculated exhaust gas where the amount of production of soot peaks and exhaust gas recirculation rate control means for changing the exhaust gas recirculation rate in a step-like manner when switching from the first combustion to the second combustion or from the second combustion to the first combustion.

2. An internal combustion engine as set forth in claim 1, wherein the exhaust gas recirculation rate control means makes the exhaust gas recirculation rate fall in a step-like manner when the first combustion is switched to the second combustion and makes the exhaust gas recirculation rate rise in a step-like manner when the second combustion is switched to the first combustion.

3. An internal combustion engine as set forth in claim 1, wherein the exhaust gas recirculation rate when the first combustion is being performed is at least about 55 percent and the exhaust gas recirculation rate when the second combustion is being performed is less than about 50 percent.

4. An internal combustion engine as set forth in claim 1, wherein the exhaust gas recirculation rate control means makes least one of an amount of recirculated exhaust gas and amount of intake air change in a step-like manner to make the exhaust gas recirculation rate change in a step-like manner when the first combustion is switched to the second combustion or the second combustion is switched to the first combustion.

5. An internal combustion engine as set forth in claim 1, wherein the temperature of the fuel and the surrounding gas when the first combustion is being performed is a temperature where the amount of NOx in the exhaust gas becomes around 10 ppm or less.

6. An internal combustion engine as set forth in claim 1, wherein the air-fuel ratio is caused to be changed in a step-like manner when the first combustion is switched to the second combustion or the second combustion is switched to the first combustion.

7. An internal combustion engine as set forth in claim 6, wherein the air-fuel ratio is made large in a step-like manner when the first combustion is switched to the second combustion and the air-fuel ratio is made small in a step-like manner when the second combustion is switched to the first combustion.

8. An internal combustion engine as set forth in claim 6, wherein the air-fuel ratio at the first combustion is made a stoichiometric air-fuel ratio or a lean air-fuel ratio slightly leaner than the stoichiometric air-fuel ratio or a rich air-fuel ratio and the air-fuel ratio at the second combustion is made a lean air-fuel ratio.

9. An internal combustion engine as set forth in claim 1, wherein an engine operating region is divided into a low load side first operating region where first combustion is performed and a high side second operating region where second combustion is performed.

10. An internal combustion engine as set forth in claim 8, wherein at the low load side operating region in the second operating region, fuel injection is carried out twice in a suction stroke and a compression stroke.

11. An internal combustion engine as set forth in claim 9, wherein boundaries between the first operating region and second operating region are comprised of a first boundary and a second boundary at a lower load side from the first boundary, the first combustion is switched to the second combustion based on the first boundary, and the second combustion is switched to the first combustion based on the second boundary.

12. An internal combustion engine as set forth in claim 11, wherein when the engine operating state remains in the second operating region and between the first boundary and the second boundary for at least a predetermined time, the second combustion is switched to the first combustion.

13. An internal combustion engine as set forth in claim 1, wherein when the first combustion is being performed, unburnt hydrocarbons are exhaust from the combustion chamber not in the form of soot but in the form of a soot precursor or a form before that and an after-treatment device for removing the unburned hydrocarbons exhausted from the combustion chamber is provided in an engine exhaust passage.

14. An internal combustion engine as set forth in claim 13, wherein the after-treatment apparatus is comprised of a catalyst having an oxidation function for oxidizing unburnt hydrocarbons exhausted from the combustion chamber.

15. An internal combustion engine as set forth in claim 14, wherein the catalyst is at least one of an oxidation catalyst, three-way catalyst, and NOx absorbent.

\* \* \* \* \*